United States Patent Office 2,709,184
Patented May 24, 1955

2,709,184

PROCESS FOR PREPARING CHLOROFLUOROCARBONS BY REACTING CARBON WITH CHLORINE AND A FLUORIDE OF A MONOVALENT ELEMENT

Earl L. Muetterties, Hockessin, Del., assignor to E. I. du Pont de Nemours and Company, Wilmington, Del., a corporation of Delaware No Drawing. Application January 19, 1954, Serial No. 405,041

7 Claims. (Cl. 260—653)

This invention relates to a new process of preparing halogenated hydrocarbons. More particularly, it relates to a process of preparing compounds containing only carbon, chlorine and fluorine, such compounds being hereinafter called chlorofluorocarbons.

The chlorofluorocarbons, a typical representative of which is dichlorodifluoromethane, are extremely valuable compounds, particularly as refrigerant liquids, also as dielectric fluids and ingredients of insecticidal compositions, e. g., as propellants for aerosols. These materials are now generally prepared by costly methods involving the replacement of chlorine by fluorine by means of selected metallic fluorides either alone or in combination with hydrogen fluoride. Processes of this kind are complicated by the fact that several steps are required to attain the final product. It has been proposed (U. S. Patent 2,407,129) to prepare chlorofluorocarbons by reacting hydrogen fluoride and chlorine simultaneously with methane over a chromium fluoride catalyst. This process is useful but still it involves the use of methane, which must first be appropriately separated from natural gas mixtures containing it, or synthesized by hydrogenation of coal.

This invention has as an object a new process for the preparation of chlorofluorocarbons. Another object is such a process employing raw materials of which two, carbon and chlorine, are very cheap, the third one being a member of a group of inorganic fluorides, of which at least some are readily available at a reasonable cost. Other objects will appear hereinatfer.

These objects are accomplished by the present invention wherein carbon is reacted at a temperature of at least 300° C. with, as essentially the sole additional reaction components, chlorine and a fluoride of an element of group I-A of the periodic table.

The periodic table referred to in this discussion is that published in Deming's "General Chemistry," (5th edition, Wiley, 1944), page 159. See also Hopkin's and Bailar's "Essentials of Chemistry" (Heath, 1946), last fly leaf and inside back cover. These I-A elements have many points of similarity in being monovalent, forming hydrides MH, water soluble hydroxides, MOH, water soluble chlorides, bromides, and iodides, etc. This table is used in many other authorities, e. g., the Handbook of Chemistry and Physics, 30th edition (1947), published by the Chemical Rubber Publishing Co. Thus, it will be seen that the inorganic fluorides suitable for the purpose of this invention are those of the following elements: hydrogen and the alkali metals, i. e., lithium, sodium, potassium, rubidium and cesium.

The reaction can be carried out in various ways. In one modification, the three reactants (carbon, chlorine and hydrogen fluoride or alkali metal fluoride) are mixed in a corrosion-resistant pressure vessel which is then sealed and heated, if desired with agitation, at the reaction temperature for a time sufficient to bring about substantial conversion. In another modification, a mixture of chlorine and hydrogen fluoride is passed through carbon heated to the reaction temperature in a suitably designed reactor, for example a tubular reactor made of refractory material such as nickel or other suitable metal, or chlorine is passed through an intimate mixture of carbon and an alkali metal fluoride. In yet another embodiment, there is used an electric arc having carbon electrodes, through which is passed a mixture of chlorine and hydrogen fluoride, or chlorine is passed through an electric arc having a carbon anode and a cathode made of carbon containing an alkali metal fluoride, which is volatilized by the heat of the arc. Chlorine can also be passed through a fluidized bed of carbon and the fluoride, heated to an appropriate temperature, or chlorine and hydrogen fluoride can be passed through a fluidized carbon bed. Whatever method is used, the reaction products, which are gaseous or readily volatile, are preferably suitably treated to remove any acidic material present, and fractionated to isolate the various constituents.

The relative ratios of the reactants are not critical. The gram atom ratio of fluorine to chlorine is in general chosen within the range from 0.03:1 to 3:1, and preferably from 0.25:1 to 1:1. Carbon is generally used in excess.

At temperatures below about 300° C. the conversions become impractical. Therefore, it is desirable to operate at temperatures above 300° C. and preferably above 400° C. The reaction temperature can be as high as can practically be obtained by known means. For example, the reaction can be carried out using as source of carbon the electrodes of a carbon arc, where the temperature is estimated to be in the range of 2500 to 3500 to 4000° C. In general, however, the preferred temperature range is from 400 to 1500° C.

Any form of carbon, whether amorphous or crystalline, is suitable for the purpose of this invention. Thus, there can be used coal, graphite, charcoal, the various forms of carbon black such as lamp black, acetylene black, bone black, etc. In general, higher conversions are obtained with active carbon, of which many well-known varieties are available commercially. Active carbon is very finely divided, porous carbon having a total surface area of at least 20 square meters per gram (Hassler, "Active Carbon," Chemical Publishing Co., 1951, p. 127). When using the carbon arc, the activity or state of subdivision of the carbon is apparently of no consequence, but the carbon must, of course, possess sufficient conductivity. The carbon need not be rigorously pure and it may, for example, contain the normal amount of ash, e. g., from 0.5 to 4% by weight in the case of most active carbons.

Of the fluorides suitable for the purpose of this invention, i. e., hydrogen fluoride and the alkali metal fluorides, several are available commercially. The others can be prepared by methods described in the literature.

The reactants should preferably be substantially anhydrous, although the reaction can tolerate the presence of some water. It is often desirable to dehydrate the carbon prior to reaction, since carbon, especially of the active or absorbent variety, can retain significant amounts of water even at high temperatures. The metallic fluorides are desirably used in anhydrous, rather than hydrated form when their crystal systems contain water of crystallization. Hydrogen fluoride of the technical grade, which contains minor amounts of water, can be used as such.

The reaction normally gives a mixture of chlorofluorocarbons, the preponderant constituents of which are in general the completely halogenated chlorofluoromethanes, with lesser amounts of the completely halogenated chlorofluoroethanes. Carbon tetrafluoride is normally present in varying amounts in the reaction product, and sometimes carbon tetrachloride is formed in minor amounts. Other products, such as chlorodifluoromethane or perfluoroethane, are occasionally found. In addition, when hydrogen fluoride is the reactant, the reaction product contains acidic materials such as unchanged hydrogen fluoride, hydrogen chloride, etc., and acidic materials are sometimes found even when hydrogen fluoride is not a reactant, owing to the presence of some moisture in the reaction mixture. The reaction product may also contain unreacted chlorine and unreacted metallic fluoride, or other compounds of metal whose fluoride was employed. The chlorofluorocarbons can be isolated by passing the gaseous reaction mixture through cold condensers and fractionating the condensate. Prior to fractionation, the crude reaction product can be separated by distillation from the unreacted chlorine and hydrogen fluoride, if the latter is present, or it can be passed through liquid scrubbing solutions such as aqueout alkaline solution to remove unreacted chlorine, hydrogen fluoride and other alkali-soluble materials.

In general, higher temperatures and/or the presence of polyvalent metal halides, which can be used as catalysts, favor the formation of more fully fluorinated products, and also the formation of halomethanes over haloethanes. High chlorine concentrations favor the formation of products containing less fluorine and more chlorine.

The invention is illustrated in greater detail in the following examples, in which parts are by weight unless otherwise noted. In these examples, the carbon used was dried before reaction by heating at 500° C. in a nitrogen atmosphere for three hours or more. The metallic fluorides were also dried at elevated temperature, either in an atmosphere of nitrogen or in an atmosphere of anhydrous hydrogen fluoride. The hydrogen fluoride used in several of the examples was the commercial product.

*Example I*

A pressure vessel lined with a nickel-iron-molybdenum alloy was charged with 8 parts of carbon black, then cooled in a carbon dioxide-acetone mixture. Twenty parts of hydrogen fluoride and 36 parts of chlorine were condensed in the cold vessel, which was then closed, heated to 500° C. and maintained at that temperature for 3 hours. After cooling the vessel, the gaseous reaction product was condensed in an evacuated stainless steel cylinder cooled with liquid nitrogen, then it was passed as gas through an aqueous solution of potassium hydroxide, then through a drying column, and finally it was fractionated in a low temperature still. The various constituents were identified by their boiling points and infrared spectra. The total amount of fluorocarbons and chlorofluorocarbons was 7 parts, consisting, on a molar basis, of 12.8% carbon tetrafluoride, 47% chlorotrifluoromethane, 18.3% dichlorodifluoromethane, 6.1% trichlorofluoromethane, and 14.6% of a mixture of chloropentafluoroethane, 1,2 - dichlorotetrafluoroethane and 1,1-dichlorotetrafluoroethane.

*Example II*

Following the procedure of Example I, a mixture of 8 parts of carbon black, 36 parts of chlorine, 20 parts of hydrogen fluoride and 4 parts of chromium II fluoride, the latter being used as a promoter or catalyst for the reaction, was heated at 500° C. under autogenous pressure for 3 hours. There was obtained 48 parts of gaseous product from which, after scrubbing with aqueous potassium hydroxide, was left 8 parts of alkali-insoluble material containing, on a molar basis, 55.7% carbon tetrafluoride, -17.5% chlorotrifluoromethane, 8.6% dichlorodifluoromethane, and 5.2% of a mixture containing chloropentafluoroethane, 1,2 - dichlorotetrafluoroethane, 1,1-dichlorotetrafluoroethane and chlorodifluoromethane. The various components were identified by their boiling points and infrared spectra and by mass spectrographic analysis.

*Example III*

A mixture of 8 parts of carbon black, 40 parts of chlorine, 22 parts of hydrogen fluoride and 5 parts of tellurium metal, used as a catalyst, was heated at 500° C. under autogenous pressure for 3 hours. There was obtained 51 parts of gaseous product which, after treatment with aqueous potassium hydroxide, left 9.7 parts of alkali-insoluble gas. Infrared analysis of this gas showed it to contain carbon tetrafluoride, chlorotrifluoromethane, dichlorodifluoromethane, chlorodifluoromethane, 1,2-dichlorotetrafluoroethane, and 1,1 - dichlorotetrafluoroethane.

*Example IV*

A mixture of 8 parts of carbon black, 30 parts of chlorine, 20 parts of hydrogen fluoride and 5 parts of antimony V chloride, used as a catalyst, was heated at 500° C. under autogenous pressure for 3 hours. There was obtained 53 parts of gaseous product, of which 11.9 parts was insoluble in aqueous potassium hydroxide. The components of this product, as identified by their boiling points and infrared spectra and by mass spectrographic analysis, were on a molar basis, carbon tetrafluoride (11.5%) chlorotrifluoromethane (66.7%), dichlorodifluoromethane (6.9%), trichlorofluoromethane (6.6%), and 8.3% of a mixture containing chloropentafluoroethane, 1,1-dichlorotetrafluoroethane, 1,2-dichlorotetrafluoroethane, and chlorodifluoromethane.

*Example V*

The experiment of Example I was repeated, except that the reaction mixture consisted of 8 parts of carbon black, 13 parts of hydrogen fluoride and 48 parts of chlorine. The alkali-insoluble gas (11.2 parts) was fractionated. The products, identified by their boiling points and infrared spectra and by mass spectrographic analysis, were, on a molar basis, carbon tetrafluoride (2%), chlorotrifluoromethane (91%), dichlorodifluoromethane (5%), trichlorofluoromethane (1%), and 1% of a mixture containing chloropentafluoroethane, 1,1-dichlorotetrafluoroethane and 1,2-dichlorotetrafluoroethane.

*Example VI*

The experiment of Example I was repeated except that the reaction mixture was heated at 400° C., instead of 500° C., for 3 hours. There was obtained 52 parts of gaseous reaction product of which 1.8 parts was insoluble in alkali. This was shown by infrared analysis to contain, on a molar basis, 5% carbon tetrafluoride, 60% chlorotrifluoromethane, 10% dichlorodifluoromethane, 3% trichlorofluoromethane, 2% chloropentafluoroethane, 4% 1,1-dichlorotetrafluoroethane, and 1% 1,2-dichlorotetrafluoroethane.

The same experiment was again repeated, but at 300° C. for 3 hours. There was obtained a small amount of alkali-insoluble product, containing carbon tetrafluoride, chlorotrifluoromethane and dichlorodifluoromethane.

*Example VII*

The experiment of Example I was repeated, except that the reaction mixture contained in addition 3 parts of tungsten VI chloride, used as catalyst. There was obtained 50 parts of gaseous product, of which 10 parts was alkali-insoluble. Fractionation of this material gave the following products, identified by their boiling points and infrared spectra, in the indicated molar amounts: carbon tetrafluoride, 12%; chlorotrifluoromethane, 80%; dichlorodifluoromethane, 5%, trichlorofluoromethane, 1%; chlorodifluoromethane, 1%; and small amounts of chloropentafluoroethane, 1,2 - dichlorotetrafluoroethane and 1,1-dichlorotetrafluoroethane.

*Example VIII*

A mixture of 10 parts of carbon black, 40 parts of chlorine and 35 parts of sodium hexafluoroaluminate (AlF$_3$·3NaF) was heated at 500° C. and autogenous pressure for 3 hours. Of the 28 parts of gaseous reaction product, 8 parts was alkali-insoluble. Fractionation of this material gave the following products, identified by their boiling points and infrared spectra, in the indicated molar amounts: carbon tetrafluoride, 8%; and chlorotrifluoromethane, 52%. The remainder consisted of dichlorodifluoromethane, trichlorofluoromethane, chloropentafluoroethane, 1,2-dichlorotetrafluoroethane and 1,1-dichlorotetrafluoroethane.

*Example IX*

A mixture of 10 parts of carbon black, 40 parts of chlorine and 42 parts of sodium fluoride was heated at 500° C. under autogenous pressure for 3 hours. The gaseous reaction product (23 parts) gave 10.1 parts of alkali-insoluble material. Fractionation of this product and infrared analysis showed that it contained, on a molar basis, 3% carbon tetrafluoride, 61% chlorotrifluoromethane, 10% dichlorodifluoromethane, 10% trichlorofluoromethane, 5% chloropentafluoroethane, 1% 1,2-dichlorotetrafluoroethane, and traces of 1,1-dichlorotetrafluoroethane and chlorodifluoromethane.

*Example X*

A mixture of 10 parts of carbon black, 36 parts of chlorine and 31 parts of potassium hexafluorophosphate ($KF \cdot PF_5$) was heated at 500° C. under autogenous pressure for 3 hours. The alkali-insoluble gaseous product (0.4 part) was shown by infrared analysis to contain the following components in the indicated molar ratios: carbon tetrafluoride, 2; chlorotrifluoromethane, 13; dichlorodifluoromethane, 5; trichlorofluoromethane, 1.

*Example XI*

A mixture of 10 parts of carbon black, 36 parts of chlorine and 40 parts of potassium hexafluorotitanate ($2KF \cdot TiF_4$) was heated at 500° C. under autogenous pressure for 3 hours. There was obtained 25 parts of gaseous product, of which 3.8 parts was alkali-insoluble. Infrared analysis of this gas showed that it contained, on a molar basis, 15% carbon tetrafluoride, 70% chlorotrifluoromethane, 5% dichlorodifluoromethane, 0.5% trichlorofluoromethane and traces of chloropentafluoroethane and 1,1-dichloro tetrafluoroethane.

*Example XII*

A tubular nickel reactor was charged with 80 parts of graphite. A slow stream of nitrogen was passed for 4 hours through the reactor heated at 600° C., after which the exit end of the reactor was connected to a copper collection system consisting of a first trap cooled in a carbon dioxide-acetone mixture and of a second trap cooled in liquid nitrogen. The temperature of the reactor was raised to 1000° C. and an approximately equimolar mixture of chlorine and hydrogen fluoride was passed through the graphite for a period of two hours. The material condensed in the liquid nitrogen trap was shown by infrared analysis to contain chlorotrifluoromethane and carbon tetrafluoride.

*Example XIII*

A gas mixture containing equal weights (4.7 g. each) of chlorine and hydrogen fluoride was brought in contact with carbon at the temperature of the carbon arc as follows: The electrodes were graphite cylinders ⅝ inch in diameter and 3 inches long with a 0.1 inch hole running longitudinally therethrough to allow passage of the gases. The electrodes were mounted in a water-cooled, gas-tight glass jacket in which was maintained an argon pressure of a few millimeters of mercury. The gas mixture entered the reaction chamber through one of the electrodees, was subjected to the action of the arc, and left the reaction chamber through the other electrode, which was connected to a system of cold traps to collect the reaction products. The arc was operated at 17 amperes and 26 volts (D. C.) and the gas mixture was passed through at the rate of 94 g. per hour. The reaction product, after washing with aqueous alkali to remove unchanged chlorine and hydrogen fluoride, contained the following components in the indicated molar ratios, as shown by infrared analysis: carbon tetrafluoride 1, carbon tetrachloride 20, chlorotrifluoromethane 20, dichlorodifluoromethane 80, and trichlorofluoromethane 40.

The invention has been illustrated by the use of hydrogen fluoride and certain specific alkali metal fluorides, but it is to be understood that this process of chlorofluorination of carbon can make use of the fluoride of any of the elements of group I–A of the periodic table. However, it will be obvious that some of the metallic fluorides in this group, e. g., the fluorides of rubidium and cesium, are of less practical value than the others for the purpose of this invention because of their limited availability. For these reasons, this invention is particularly directed to the use of the more accessible and more economical fluorides in this group, which are hydrogen fluorides and the fluorides of those alkali metals having atomic numbers from 3 to 19, inclusive, i. e. lithium, sodium and potassium. Still more specifically, it is preferred from both the economic and the technical standpoints to use hydrogen fluoride or sodium fluoride, and particularly the former.

Mixtures of two or more fluorides can be used. Moreover, as shown in some of the examples, complex fluorides, e. g., ternary fluorides, can be used. Other examples of such complex fluorides include the potassium hydrogen fluorides, $KF \cdot HF$ and $KF \cdot 3HF$, sodium fluoroantimonites, $xNaF \cdot SbF_3$, where $x$ is 1, 2 or 3, sodium fluorosilicate, $2NaF \cdot SiF_4$, sodium fluoroantinomates, $NaSbF_6$, etc.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of chlorofluorocarbons wherein carbon is reacted at a temperature of at least 300° C. with, as the sole additional reactants, chlorine and a fluoride of a group I–A element.

2. A process for the preparation of chlorofluorocarbons wherein carbon is reacted at a temperature of at least 300° C. with, as the sole additional reactants, chlorine and a fluoride of a monovalent element M, said element being one which forms a hydride MH, and whose hydroxide, chloride, bromide, and iodide are soluble in water.

3. A process according to claims 1 and 2 wherein the process is carried out under substantially anhydrous conditions.

4. A process according to claim 3 wherein there is present as a catalyst a polyvalent metal halide.

5. A process for the preparation of chlorofluorocarbons wherein carbon is reacted under substantially anhydrous conditions at a temperature of at least 300° C. with, as the sole reactants, chlorine and hydrogen fluoride.

6. A process for the preparation of chlorofluorocarbons wherein carbon is reacted under substantially anhydrous conditions at a temperature of at least 300° C. with, as the sole reactants, chlorine and an alkali metal fluoride.

7. A process for the preparation of chlorofluorocarbons wherein carbon is reacted under substantially anhydrous conditions at a temperature of at least 300° C. with, as the sole reactants, chlorine and a fluoride of an alkali metal of atomic number no higher than 19.

References Cited in the file of this patent

UNITED STATES PATENTS

| Number | Name | Date |
|---|---|---|
| 1,966,115 | Lazier | Apr. 2, 1935 |
| 2,407,129 | Benning et al. | Sept. 3, 1946 |
| 2,456,027 | Simons | Dec. 14, 1948 |
| 2,684,987 | Mantell et al. | July 27, 1954 |